Dec. 1, 1964  C. F. WHITE  3,159,097
BALE PRESS
Filed Dec. 30, 1963  3 Sheets-Sheet 1

CECIL F. WHITE
INVENTOR

Huebner & Worrel
ATTORNEYS

CECIL F. WHITE
INVENTOR

Huebner & Worrel
ATTORNEYS

United States Patent Office 3,159,097
Patented Dec. 1, 1964

3,159,097
BALE PRESS
Cecil F. White, 5674 N. Delano, Fresno, Calif.
Filed Dec. 30, 1963, Ser. No. 334,465
5 Claims. (Cl. 100—214)

The present invention relates to a bale press initially developed for use on cotton bales but which may be employed on bales of other materials having circumscribing constraining bands and more particularly to such a press which facilitates the removal of such bands.

Compressors of baled cotton usually employ a relatively low-powered press, which is commonly known as a "Dinky Press," for further compressing bales of lightly compressed cotton to release their constraining bands. Even with such lightly compressed bales the high tension of the bands and compaction of the cotton normally preclude the insertion of a suitable disbanding tool between the band and the bale. For economy purposes, the bands are re-used on bales of cotton which are subsequently re-compressed to a higher density smaller size. It is common practice initially to compress the bale between a pair of platens sufficiently to loosen the bands for ready removal. After all the bands are cut or otherwise unfastened, the platens are retracted to relieve compression on the bale. However, portions of the bands remain beneath the bale which must be removed so as not to interfere with subsequent disposition of the bale. Inasmuch as the full weight of the bale is disposed against the bands, they are difficult to remove and frequently are twisted, bent or otherwise deformed, making them unfit for subsequent use. If the bands are not removed, the free ends of the bands hinder removal of the bale from the press and present a hazard to workmen.

Therefore, it is a broad object of the present invention to provide an improved press for bales having circumscribing constraining bands.

Another object is to provide an improved bale press which permits removal of the bands prior to removal of the bale from the press.

Another object is to provide such an improved press which facilitates removal of the constraining bands from the bale with a minimum of damage to the bands and to the bale.

Another object is to expedite the disbanding of bales.

Another object is to provide a press of the character described which enables free removal of the bands from the bale with a minimum of physical effort.

Other objects and advantages of the present invention will subsequently become more clearly apparent upon reference to the following description in the specification.

In the drawings:

FIG. 5 is a further enlarged cross section of the movable pressing member and bale lifting mechanism of FIG. 4.

Figure 3:
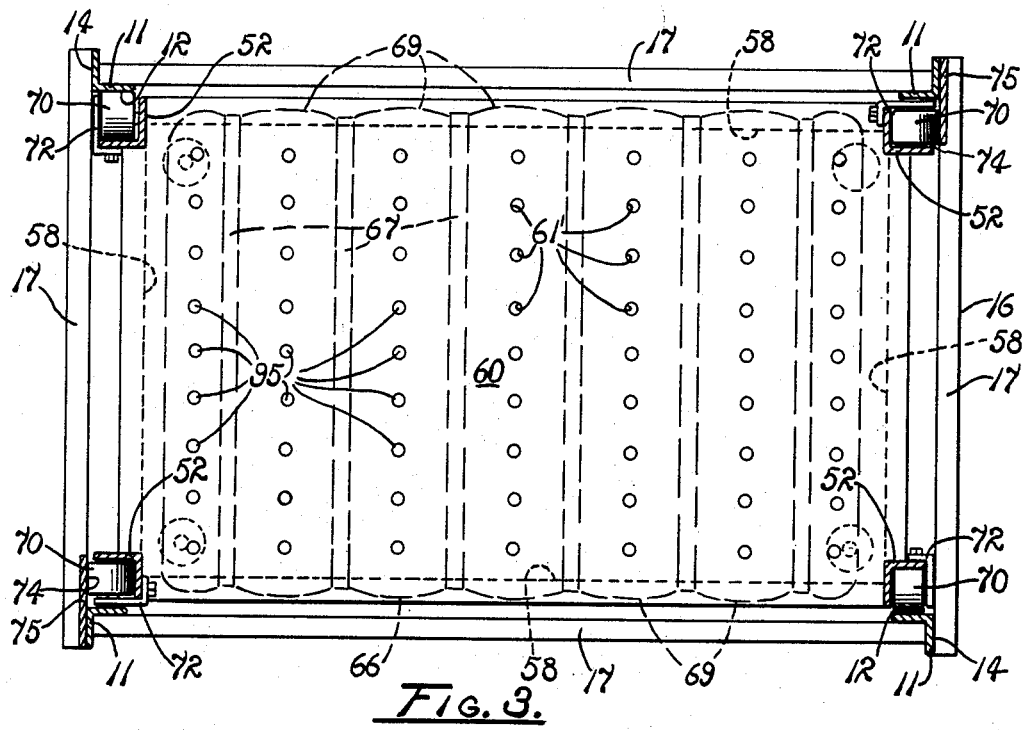
FIG. 3 is a somewhat enlarged horizontal section taken on line 3—3 of FIG. 2.

Referring more particularly to the drawings, the press of the present invention provides an open box-like substantially upright outer frame 10 having a plurality of corner posts 11 of elongated angle iron material arranged in spaced rectangular relations, as viewed in plan in FIG. 3. The posts provide inwardly facing track surfaces 12 and right angularly disposed outwardly facing surfaces 14. The outer frame includes a lower base end 16 formed by a plurality of substantially horizontal channel members 17 extended in interconnecting relation between the corner posts 11 and an upper end 18 similarly formed by a plurality of interconnecting channel members 19 extended between the corner posts in substantially parallel relation to the lower channel member 17. A platform 25 is disposed intermediate the upper and lower ends of the outer frame which is constructed of a plurality of channel members 26 disposed in interconnecting relation between the corner posts 11 and by a pair of cross members 27. An upper fixed platen 30 is mounted in depending relation from the platform 25 in downwardly spaced substantially parallel relation thereto by a plurality of channel members 32 and spaced cross members 33.

Figure 2:
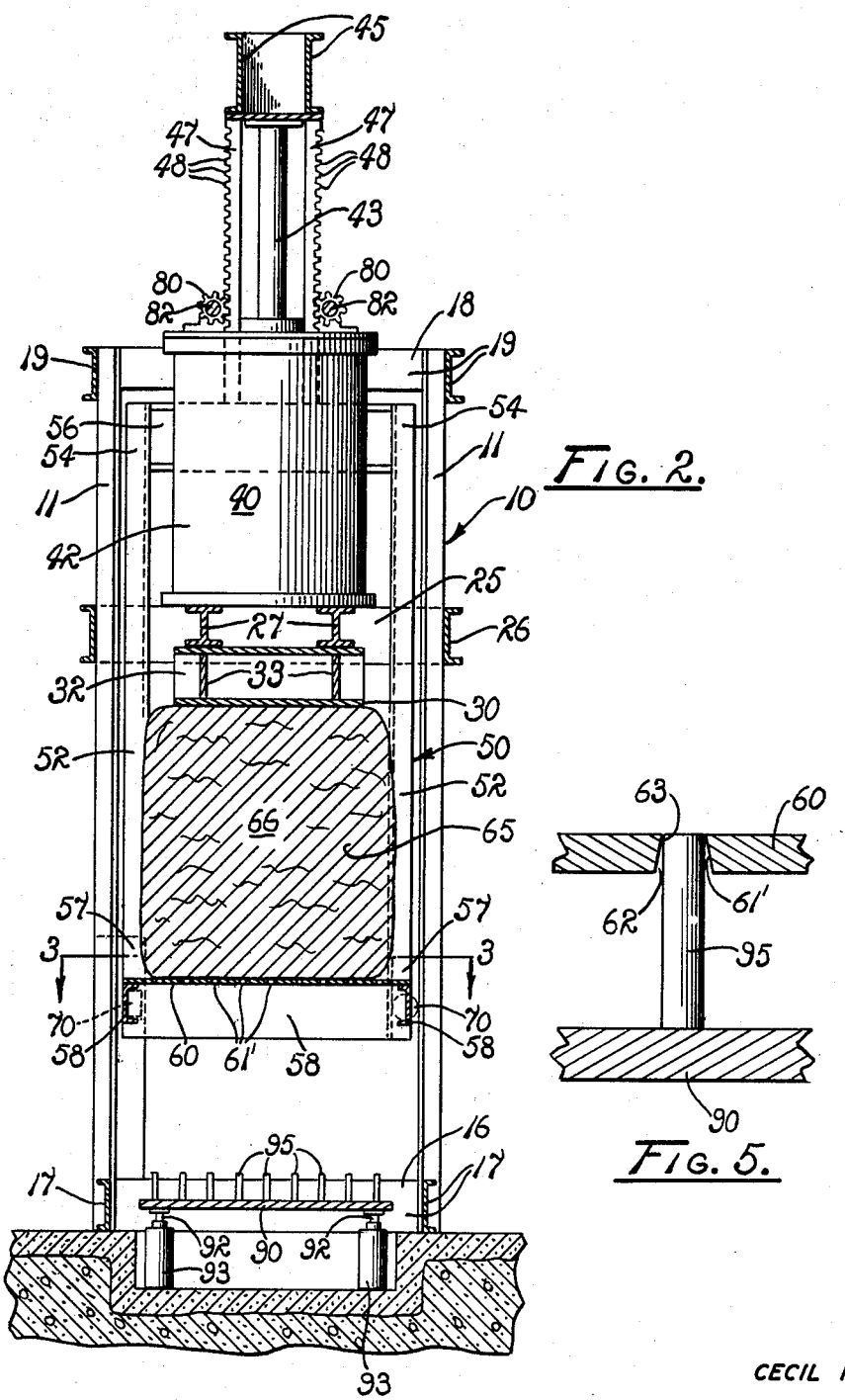
FIG. 2 is a vertical cross section through the press taken along line 2—2 of FIG. 1 showing the movable press member retracted to a bale compressing position.

An elongated cylindrical ram 40 provides a cylinder portion 42 mounted within the outer frame on the platform 25 and a piston rod 43 upwardly extendable therefrom as in FIG. 2 which is actuated by air, hydraulic fluid or the like. A pair of spaced substantially parallel channel members 45 are mounted on the rod 43 of the ram in right angular relation thereto and are individually interconnected at their ends by a pair of spaced substantially parallel hanger arms 47 extended downwardly within the outer frame 10. Each of the hanger arms 47 provides edgewardly opposite rack teeth 48.

An inner reciprocably movable frame 50 is mounted within the outer frame 10 on the lower ends of the hanger arms 47. The inner frame includes a plurality of elongated corner posts 52 inwardly adjacent to the corner posts 11 of the outer frame 10. The inner frame includes an upper end formed by a plurality of interconnecting channel members 56 disposed between the corner posts which are rigidly mounted, as by welding or the like, on the lower ends of the hanger arms 47. The inner frame includes a downwardly spaced lower end 57 formed by a plurality of channel members 58 interconnecting the lower ends of the corner posts in supporting relation to a substantially flat pressing platen 60.

The pressing platen 60 provides a substantially unobstructed upper bale support surface 61 and a plurality of rows of spaced openings therethrough, each of which, as best shown in FIG. 5, is formed to provide a lower entrance portion 62 and an upper constricted portion 63. The rigid upper platen 30 and the movable lower pressing platen 60 thereby define a bale compressing chamber 65 therebetween within the outer frame 10 which is adapted to receive a cotton bale 66 therein in superimposed relation on the upper surface 61 of the pressing platen 60. The bale has plurality of elongated bands 67 tensioned thereabout with each band providing ends held by a fastening member 68. The bands are equally spaced to define bale interstice portions 69 therebetween which, as best shown in FIG. 3, are precisely aligned with the rows of openings 61' in the pressing platen 60.

The inner frame 50 is transversely supported during reciprocation against binding from excessive transversely directed thrust forces by a plurality of rollers 70 mounted on angle brackets 72 individually connected to the corner posts 52 in right angularly related sets. As best shown in FIG. 3, the sets of rollers are diagonally, similarly disposed for rotation about spaced substantially parallel axes of rotation. The sets of rollers individually roll upon the inner track surfaces 12 of the corner posts 11 of the outer frame 10 and upon the inner track surface 74 of a plurality of rail members 75 mounted on the outwardly facing surfaces 14 of the corner posts 11. The hanger arms 47 are also constrained during reciprocation by a plurality of gears 80 which are meshed with the rack teeth 48 along opposite edges of the arms which are supported on elongated shafts 82 journaled in a plurality of bearing blocks 83 mounted on the channel members 19 of the upper end 18 of the outer frame 10.

An auxiliary movable plate 90 is mounted within the outer frame 10 adjacent to the lower base end 16 thereof beneath the pressing platen 60 in spaced substantially parallel relation thereto. The auxiliary plate is supported on the rod ends 92 of a plurality of hydraulic jacks 93 which are controllable to raise and lower the plate by controlled supply and release of air, hydraulic fluid, or the like. The auxiliary plate mounts a plurality of rows of equally spaced bale lifting pins 95 in upwardly extended relation therefrom in precise registry with the openings 61' in the pressing platen.

*Operation*

Figure 1:
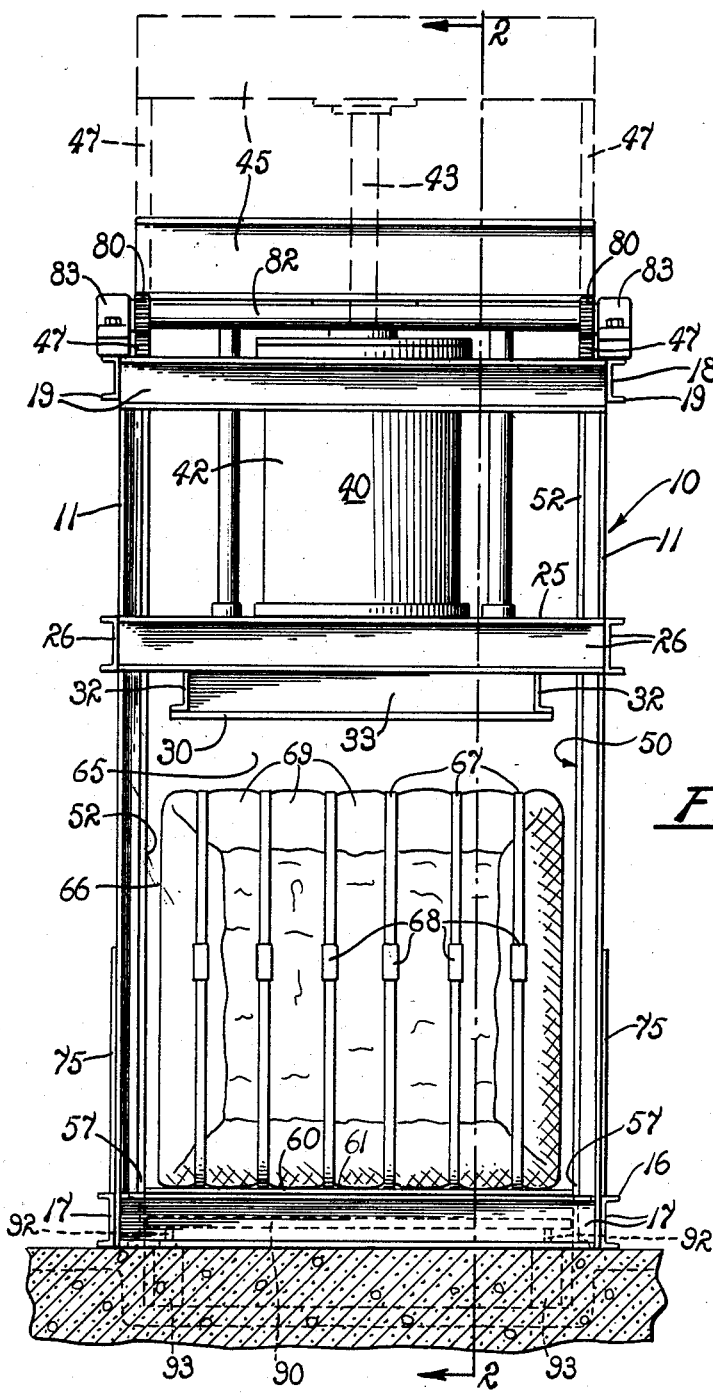
FIG. 1 is a side elevation of the press of the present invention having a banded bale disposed therein with the movable press portion thereof extended in a bale receiving and discharge position.

The operation of the described embodiment of the subject invention is believed to be clearly apparent and is briefly summarized at this point. With the rod 43 of the cylinder 42 retracted and the pressing platen 60 disposed in the downwardmost position of FIG. 1, a cotton bale 66 is inserted into the bale compressing chamber 65 within the outer frame 10 and rested on the pressing platen 60. As best shown in FIG. 3, with the bale disposed in such position, the interstice portions 69 of the bale are precisely aligned with the openings 61' in the pressing platen. Upon actuation of the rod 43 of the cylinder 42, the pressing platen and bale are elevated to the bale compressing position of FIG. 2. During such compression of the bale, the bands 67 are loosened sufficiently to permit removal of the fastening members 68 interconnecting their opposite ends or to permit them to be cut. After such removal, the rod of the cylinder 42 is retracted to lower the bale 66 and pressing platen 60 to the position of FIG. 1. During movement of the pressing platen to such lower extended position, the bale lifting pins 95 are received and guided into the openings 61' through the large entrance portion 62 thereof to a position with the ends of the pins disposed in coplanar relation with the upper surface of the pressing platen or slightly therebelow. It is noted that the funneling configuration of the openings permits a certain amount of misalignment and tends automatically to self-align the pins for precise entry into the openings.

Figure 4:
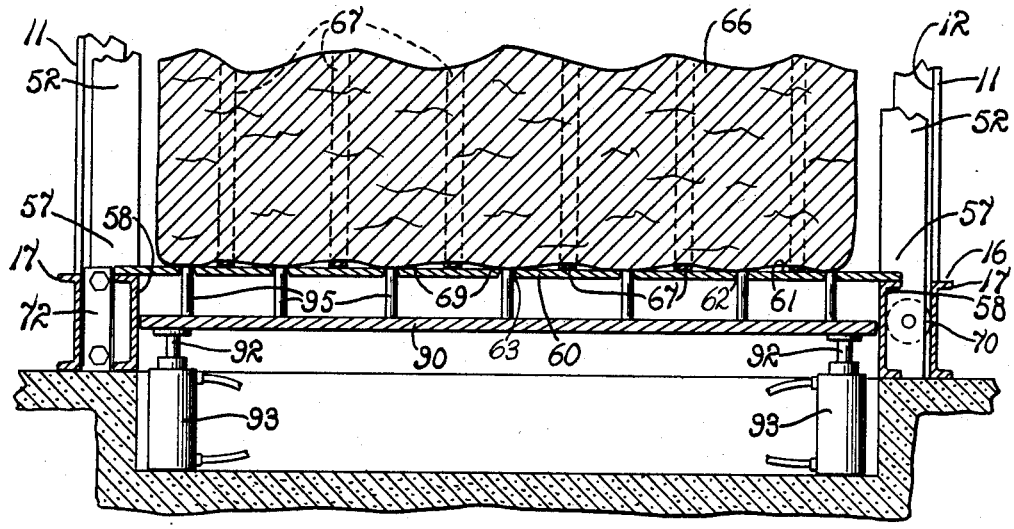
FIG. 4 is a fragmentary somewhat enlarged vertical cross section through the movable pressing member disposed in the extended position of FIG. 1 showing a bale lifting mechanism associated therewith.

It is apparent that with the bale 66 and the pressing platen 60 disposed in the lower extended position of FIG. 4, the full weight of the bale is disposed against the portion of the bands between the bale and the platen. The jacks 93 are then actuated to raise the auxiliary plate 90 to extend the bale lifting pins upwardly through the openings 61' in the pressing platen 60. During such movement of the auxiliary plate, the pins engage the interstice portion 69 of the bale to raise the same and to free the portions of the bands disposed between the bale and the platen. The bands are then drawn outwardly from beneath the bale between the pins 95 without damaging the bands or the bale. The jacks 93 are then retracted to lower the auxiliary plate and the pins to permit ready removal of the bale from the press.

In view of the foregoing, it is readily apparent that the structure of the present invention has provided an improved press for removing the constraining bands from cotton bales with a minimum of physical effort and without damaging the bands or the bales. It is also significant that the press permits the bands to be removed prior to removal of the bale from the press with such removal of the bale being subsequently accomplished with no interference from the loose ends of the bands as with conventional dinky presses. Furthermore, the pressing platen 60 provides an unobstructed bottom for the compressing chamber 65 which permits free entry of bales into the press and unrestricted removal therefrom by hand trucks or automatic equipment, not shown.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A press for cotton bales having a plurality of spaced constraining bands disposed tightly therearound comprising a stationary reaction platen; a movable pressing platen downwardly spaced from the stationary platen providing a plurality of spaced rows of openings therethrough and a substantially unobstructed bale support surface, the platens defining a bale compressing chamber therebetween and with said rows of openings being aligned with interstices between said bands on such a bale disposed within the chamber; controlled powered means connected to said pressing platen for reciprocating the same between a position compressing the bale within the chamber so as to cause loosening and to permit detachment of the bands thereon and a position permitting the removal of the bale from the chamber; and lift means extendable through said openings in the pressing platen engageable with said interstices of the bale between the bands when the pressing platen is disposed in said bale removing position for raising the bale from said pressing platen for ready removal of the bands from the bale and retractable from the openings to permit unrestricted removal of the bale from said chamber.

2. A press for cotton bales having a plurality of spaced constraining bands disposed tightly thereabout comprising a stationary reaction platen; a movable pressing platen elevationally spaced from the reaction platen, the lower of said platens providing a plurality of spaced rows of openings therethrough and a substantially unobstructed upper bale support surface, said platens defining a bale compressing chamber therebetween with said rows of openings aligned with the interstices between said bands on such a bale disposed within the chamber; first controlled powered means connected to said pressing platen for reciprocating the same between a position compressing the bale within the chamber so as to cause loosening of the bands to permit detachment thereof and a position permitting the removal of the bale from the chamber; lift means registered with said openings in the lower platen; and second controlled powered means connected to said lift means for extending the same through the openings in said lower platen against said interstices of the bale between the bands when the pressing platen is disposed in said bale removing position for raising the bale sufficiently from said upper support surface of the lower platen to permit ready removal of the bands from the bale and for retracting said lift means from the openings to lower the bale upon said upper support surface of the lower platen permitting unrestricted removal of the bale from said chamber.

3. A press for cotton bales having a plurality of circumscribing constraining bands in substantially equally spaced relation defining interstice bale portions therebetween comprising a substantially upright frame; an upper reaction platen mounted in a stationary position in the frame; a pressing platen downwardly spaced and substantially parallel to the reaction platen mounted in the frame for reciprocal elevational movement, providing a plurality of spaced rows of openings therethrough and a substantially unobstructed upper bale support surface, said platens defining a bale compressing chamber therebetween; first controlled powered means mounted on the frame having driving connection to said pressing platen for reciprocating the same between an upper position compressing such a bale within the chamber so as to cause loosening of the bands to permit their release and a lower position permitting removal of the bale from the chamber; a movable auxiliary support plate mounted on the frame below said pressing platen; and a plurality of bale lifting members mounted on said support plate in upward extension therefrom in registry with said openings in the pressing platen for movement upwardly through the openings when the pressing platen is in its lower position to raise the bale from said upper support surface of the pressing platen for ready removal of the bands from the bale and for subsequent movement downwardly from said lifting members below said upper support surface of the pressing platen to permit unrestricted removal of the bale from the chamber.

4. A press for cotton bales having a plurality of circumscribing constraining bands in substantially equally spaced relation defining interstice bale portions therebetween comprising a substantially upright frame; an upper reaction platen mounted in a stationary position in the frame; a pressing platen downwardly spaced and substantially parallel to the reaction platen mounted in the frame for reciprocal elevational movement, providing a plurality of spaced rows of openings therethrough, and with the reaction platen defining a bale compressing chamber therebetween; first controlled powered means mounted on the frame having driving connection to said pressing platen for reciprocating the same between an upper position compressing such a bale within the chamber so as to cause loosening of the bands to permit their release and a lower position permitting removal of the bale from the chamber; a movable auxiliary support plate mounted on the frame below said pressing platen; rows of elongated bale lifting pins mounted on said support plate in upward extension therefrom in registry with said openings in the pressing platen; and second controlled means mounted on the frame connected to said auxiliary support plate for motivating the same toward the pressing platen to extend said lifting pins through said openings against said interstice portions of the bale for raising the bale to permit ready removal of said bands, said openings being upwardly funneling to guide said pins through the pressing platen.

5. A press for cotton bales having a plurality of circumscribing constraining bands in substantially equally spaced relation defining interstice bale portions therebetween comprising a substantially upright frame; an upper reaction platen mounted in a stationary position in the frame; a pressing platen downwardly spaced and substantially parallel to the reaction platen mounted in the frame for reciprocal elevational movement, providing a plurality of openings therethrough, and with the reaction platen defining a bale compressing chamber therebetween; first controlled powered means mounted on the frame having driving connection to said pressing platen for reciprocating the same between an upper position compressing such a bale within the chamber so as to cause loosening of the bands to permit their release and a lower position permitting removal of the bale from the chamber; a movable auxiliary support plate mounted in the frame below said pressing platen; bale lifting elements individual to the openings in the pressing platen mounted on said support plate in upward extension therefrom in registry with their respective openings in the pressing platen for slidable extension therethrough; and second controlled means mounted on the frame connected to said auxiliary support plate for motivating the same toward the pressing platen to extend said lifting elements through said openings against said interstice portions of the bale for raising the bale to permit ready removal of said bands.

References Cited by the Examiner

UNITED STATES PATENTS

| 88,059 | 3/69 | Millerd | 100—245 |
| 856,803 | 6/07 | Phillips | 100—100 |
| 988,469 | 4/11 | Howlett | 100—295 X |
| 1,434,587 | 11/22 | Broadley | 214—310 |
| 2,200,998 | 5/40 | Schnuck | 100—269 X |
| 2,639,050 | 5/53 | Hoffmann | 214—310 |
| 2,820,282 | 1/58 | Schneider | 100—1 X |
| 3,122,092 | 2/64 | Sinclair | 100—269 |

FOREIGN PATENTS 218,384    3/42    Switzerland.

WALTER A. SCHEEL, *Primary Examiner.*